United States Patent
Ben David

(10) Patent No.: US 11,904,476 B2
(45) Date of Patent: Feb. 20, 2024

(54) METHOD OF AUTOMATED COOKWARE HANDLING IN ROBOTIC SYSTEMS, AND IN DIFFERENT HANDLING ENVIRONMENTS

(71) Applicant: Kitchen Robotics Ltd, Modiin (IL)

(72) Inventor: David Ben David, Rehovot (IL)

(*) Notice: Subject to any disclaimer, the term of this patent is extended or adjusted under 35 U.S.C. 154(b) by 801 days.

(21) Appl. No.: 17/016,429

(22) Filed: Sep. 10, 2020

(65) Prior Publication Data

US 2022/0072705 A1    Mar. 10, 2022

(51) Int. Cl.
B25J 11/00    (2006.01)
B25J 9/16    (2006.01)
G05B 19/4155    (2006.01)
B25J 15/06    (2006.01)

(52) U.S. Cl.
CPC ......... *B25J 9/1664* (2013.01); *B25J 11/0045* (2013.01); *B25J 15/0608* (2013.01); *G05B 19/4155* (2013.01); *G05B 2219/45083* (2013.01); *Y10S 901/31* (2013.01); *Y10S 901/40* (2013.01)

(58) Field of Classification Search
CPC ... B25J 11/0045; Y10S 901/30; Y10S 901/31; Y10S 901/40; A47J 44/00
See application file for complete search history.

(56) References Cited

U.S. PATENT DOCUMENTS

| | | | |
|---|---|---|---|
| 6,592,324 B2 | 7/2003 | Downs et al. | |
| 10,029,851 B1* | 7/2018 | Durham | B65G 1/1373 |
| 10,729,281 B2* | 8/2020 | Knuepfel | A47J 31/52 |
| 2005/0036231 A1 | 2/2005 | Dickey et al. | |
| 2009/0146440 A1* | 6/2009 | Buljo | B25J 11/0045 |
| | | | 294/61 |
| 2015/0332950 A1* | 11/2015 | Mazzocco | H01L 21/683 |
| | | | 901/30 |
| 2016/0167228 A1* | 6/2016 | Wellman | B25J 9/1602 |
| | | | 901/3 |
| 2020/0268210 A1* | 8/2020 | He | B25J 11/0045 |
| 2021/0069910 A1* | 3/2021 | Oleynik | F25D 23/028 |
| 2021/0321827 A1* | 10/2021 | Zarcone | F24C 15/18 |
| 2022/0031122 A1* | 2/2022 | He | A47J 44/00 |
| 2022/0225826 A1* | 7/2022 | Ben-David | A47J 37/0641 |
| 2022/0386822 A1* | 12/2022 | Itano | B25J 11/0045 |

FOREIGN PATENT DOCUMENTS

WO    WO2002068157    9/2002

* cited by examiner

*Primary Examiner* — Reginald Alexander
(74) *Attorney, Agent, or Firm* — Haim M. Factor; 1st-Tech-Ideas.com

(57) ABSTRACT

The present invention relates to a method of cookware handling in varied environments including that in robotic systems, production lines, automated cooking and ingredient collection systems, washing and sanitizing manual or automated systems. The method involves use of electromagnetic force to generate friction that translate into gripping force for the cookware or likewise. The electromagnetic force may be generated by degaussing electromagnets.

7 Claims, 3 Drawing Sheets

METHOD OF AUTOMATED COOKWARE HANDLING IN ROBOTIC SYSTEMS, AND IN DIFFERENT HANDLING ENVIRONMENTS

FIELD OF THE INVENTION

The present invention relates to a method of automated handling of cookware in varied cooking environments, especially in commercial kitchens, dark kitchens (also referred as cloud or ghost kitchens), production environments, such as automated production lines, factories and workshops, robotic warehouses and material (or ingredients) collection systems.

BACKGROUND OF THE INVENTION

The rising level of automation in cooking environments is primarily focussed on motions systems and pick and place mechanisms, handling of cold or heated cookware. Such cookware might be empty or contain food, that may be of solid, liquid or of powder ingredients. Moreover, the cookware might be heated, wet or contaminated. The cookware geometry, weight, material and surface finish might vary or alter over time.

Further, automated cookware handling systems introduce forces to the handled cookware, such as rapid accelerations, impacts during handling and ingredient collection, pressure resulted by a water jet, applied during a washing process.

Various patents in a plurality of invention on similar theme illustrates the discussed points.

US20050036231 A1 titled, "Automated storage library gripper apparatus and method" A mechanical gripper mechanism for transporting and handling storage devices is provided. In one example, the gripper mechanism includes a pair of opposing gripper fingers rotatably mounted to the picker frame, each having a distal end adapted to engage opposite minor side surfaces of a storage device. The opposing gripper fingers are further interconnected by corresponding geared surfaces such that the gripper fingers rotate together. In one example, the proximal ends of the gripper fingers include geared surfaces that are directly coupled to rotate the gripper fingers together.

U.S. Pat. No. 6,592,324B2 titled, "Gripping mechanism" talks of a gripper apparatus for grasping an object such as a specimen holder. The gripper apparatus comprises two arms. In one embodiment the arms are pivotable, and in a second embodiment, each arm includes a pivotable member. The arms are moveably coupled to each other and are structured to grasp the object there-between.

WO2002068157 A2 titled, "Gripping mechanisms, apparatus, and methods" provides grasping mechanisms, gripper apparatus/systems, and related methods. Grasping mechanisms (20) that include stops, support surfaces (40), and height adjusting surfaces (45) to determine three translational axis positions of a grasped object are provided. In addition, grasping mechanisms that are resiliently coupled to other gripper apparatus components are also provided.

While the above inventions discuss various mechanisms of gripping in automated environments, these are not associated with cookware handling. To undertake an automated cookware handling on a daily basis, not only automation but also the sustainability of such a process needs to be given credence. Such a need leads to a creation of a demand for universal and highly durable cookware handling, more so, sustainable gripping techniques. The present invention tries to achieve the said objective illustrated in the below-mentioned process.

SUMMARY OF THE INVENTION

An aspect of this invention is to provide a method for handling, picking and placing of cookware in an automated manner.

Another aspect of the invention is to incorporate the method of handling cookware, among others, in robotic cooking systems, and in washing systems, automated production lines or manual operation.

A further aspect of the invention is to provide a cookware gripping mechanism, which may be mounted on a motion system, such as single axis or multi axes linear motion system or rotational motion system.

A still further aspect of the invention is activating and deactivating the gripping function using an electrical current and further retaining the gripping force during power loss.

A still further aspect of the invention is the provision of gripping a heated cookware by electromagnets, even when the cookware temperature is as high as 160 degrees C. which is the heat sterilization temperature.

A still further aspect of the invention is liquid proof gripping mechanism. In applying such a feature, the principle of electromagnets being liquid proof and resistant to high temperature range is utilized wherein, the cookware can be gripped and manipulated throughout the processes of liquid ingredient collection, washing and sanitizing whereby the cookware are invariably exposed to liquids, such as, during liquid ingredient collection, washing and sanitizing. Further, such a technique ensures zero error in the gripping mechanism thereby ensuring the sustainability of the system.

Another aspect of the invention is initiating the handshake of the cookware using two or more gripping mechanisms which enables, delivering the cookware from one gripping mechanism to another, using linear motion or rotating motion.

BRIEF DESCRIPTION OF THE DRAWINGS

The present invention will become more fully understood from the detailed description and the accompanying drawings. The drawings constitute a part of this specification and include exemplary embodiments of the invention, which may be embodied in various forms. In addition, in the embodiments depicted herein, like reference numerals in the various drawings refer to identical or near identical structural elements.

Figure 1:
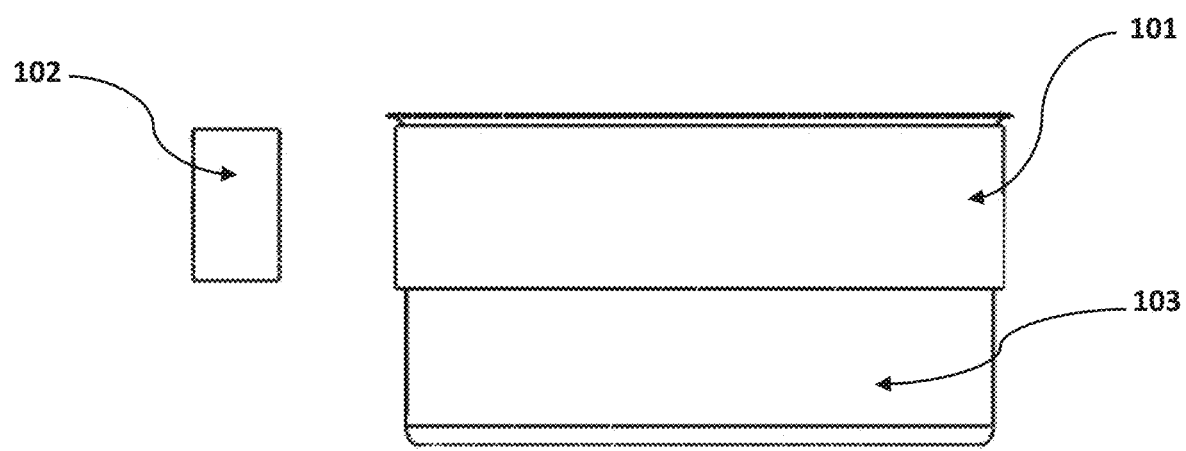
FIG. 1 represents the cookware with attached ferritic sleeve and electromagnet.

REFERENCE NUMERALS 101 ferritic sleeve
102 electromagnet (described a round section electromagnet)
103 cookware (described a round pot)
201 gripping mechanism #2 electromagnets
202 cookware
203 gripping mechanism #1 electromagnets

DETAILED DESCRIPTION OF THE PREFERRED EMBODIMENTS

The preferred forms of the invention will now be described with reference to FIGS. 1-4. The appended claims are not limited to the preferred forms and no term and/or phrase used herein is to be given a meaning other than its ordinary meaning unless it is expressly stated that the term and/or phrase shall have a special meaning.

The present invention provides for a sustainable method for cookware handling, picking and placing of cookware in a plurality of environments. Thus the method can be incorporated, not only in robotic cooking systems, but also in washing systems, automated production lines or manual operation without any reduction in the gripping ability.

Usually, in robotic cooking systems, and in washing systems and automated production lines, the involvement of cookware handling like picking of the cookware and transferring the cookware to another place for the next operation which may be the next stage of cooking, apart from washing the cookware or sanitizing the cookware, is very common. Such handling invariably requires the cookware to be gripped and then transferred to the next place for the next operation.

The cookware gripping mechanism of the present invention may be operable when mounted on a motion system, such as single axis or multi axes linear motion system or rotational motion system.

The above mechanism is possible through use of electromagnetic force to generate friction that translate into gripping force for the cookware or likewise. The electromagnetic force may be generated by degaussing electromagnets. The type of the electromagnets and the magnetic force generated by the electromagnets may cover a high range of variables, such as, the cookware weight, size, geometry, applied forces and working conditions. The electromagnetic force thus generated is applied on a ferritic or martensitic material, such as iron.

In an embodiment of the present invention, the mentioned gripping force is derived from a series of considerations and requirements, which include but are not limited to cookware weight, geometry and material, motions system characteristics, such as accelerations and impacts, mechanical interfaces, working conditions and environmental aspects.

Delving further into the derivation, the cookware motion characteristics, such as accelerations and decelerations add loads parallel to the motion vector, thereby deriving the frictional force (which is a function of the electromagnetic force and the coefficient of friction) accordingly. Thereupon, considering a specific coefficient of friction between the electromagnets and the contact area with the cookware (or the sleeve, in case required), electromagnetic force property of the electromagnets is thus configured accordingly and the gripping force derived.

In some embodiments, the electromagnets utilized may be rectangular or round which may comply with the derived gripping force, which have different mechanical interfaces, weight properties and electromagnetic field profile. The configuration of the electromagnets depends also upon the system requirements, which include the motion system requirements.

Referring to FIG. 1, in some embodiments, if the cookware 103 is made of non-ferritic material, a ferritic or martensitic sleeve 101 may be attached to it. The sleeve material will have high relative magnetic permeability (14 for most ferritic steels), for higher efficiency of the electromagnetic force, applied on it. The sleeve geometry and dimensions are derived from the type, dimensions and electromagnetic force of the electromagnets 102.

Further, the geometry of the cookware sleeve (in case required) design and physical properties complies with the defined electromagnet. Also, the contact area of the cookware with the electromagnets will at least be the surface area of the electromagnets. The geometry of the sleeve, which is highly dependent on the cookware geometry, dictates the shape and type of the electromagnets as well.

The electromagnetic force generated by the electromagnets depends upon the physical properties of the ferretic sleeve. The specific properties are:

1. The thickness of the sleeve and the material properties, such as permeability that increases the electromagnetic forces.
2. The surface finish and the coefficient of friction of the contact area of the sleeve that also increases the applied friction force and hence the griping force.
3. The curvature of the sleeve also has crucial effect on the electromagnetic force. The higher the curvature of the sleeve, the lower the efficiency of the electromagnets, and thus the electromagnetic forces.

An example that proves the above property is of a narrow sleeve resulting in narrow contact area, thereby requiring an appropriate shape of the electromagnet. In such case, the electromagnetic force of a single electromagnet might not be sufficient and multiple electromagnets might be used.

Thus, the method of the present invention, achieves the gripping of the cookware by generating friction between the electromagnets and the cookware or the attached ferritic sleeve.

The electromagnetic force, acting as a force vector perpendicular to the cookware contact surface, is a derivative of the required friction force, depending on the coefficient of friction of the cookware contact surface, or the ferritic sleeve contact surface.

The coefficient of friction may vary depending on the working conditions, such as greasy environment. For example, in some embodiments, if the cookware is exposed to organic or non-organic materials, or substances, having lubricity properties, the contact surfaces with the electromagnets might be contaminated, thereby, altering their surface characteristics, among which is the coefficient of friction, which may be reduced. In such a scenario, increasing the electromagnetic force may compensate the variations of the friction coefficient, without damaging the cookware (since no compression forces are applied).

Further, in some embodiments, the use of the electromagnets in washing systems might expose the cookware contact area with the electromagnets to various organic materials, liquids and chemicals. In addition the cookware may be exposed to high temperatures, during the washing cycle of the sanitation. These working conditions might influence the coefficient of friction of the contact area of the cookware with the electromagnets, requiring a higher electromagnetic force, and thus have to be configured accordingly.

The cookware gripping mechanism may require the cookware to be gripped under the following conditions:

Gripping a heated cookware

Gripping the cookware having liquid

In some embodiments, the mechanism of the system may involve gripping of a heated cookware. This is achieved by generating frictional forces required for gripping and manipulating the cookware by the electromagnets. Since, most electromagnets are capable of operating in high to extreme temperatures besides harsh working conditions, making them durable to exposure to heat even when the cookware temperature is as high as 160 degrees C. (heat sterilization temperature).

An embodiment of the present invention is the gripping mechanism of the cookware being liquid proof. It is a common phenomenon that the cookware is applied with liquid based ingredients during cooking, washing and sanitization, which comprise of oil, liquid detergents and water as the ingredients. In the presence of such liquid, the gripping mechanism of the cookware remains liquid proof.

This is due to the fact that electromagnets are liquid proof and resistant to high temperature range, and thus, the cookware can be gripped and manipulated throughout the processes of exposure to liquids, such as liquid ingredient collection, washing and sanitizing.

The gripping mechanism requires activation and deactivation of the gripping function to release and pick up the desired cookware for the next operation. This is achieved by application of electric current. Using 2 or more gripping mechanisms enable delivering the cookware from one gripping mechanism to another, using linear motion or rotating motion. Handshake is achieved by activation and deactivation sequence of the electromagnets when in contact with the cookware gripping surface or the ferritic sleeve.

Figure 2:
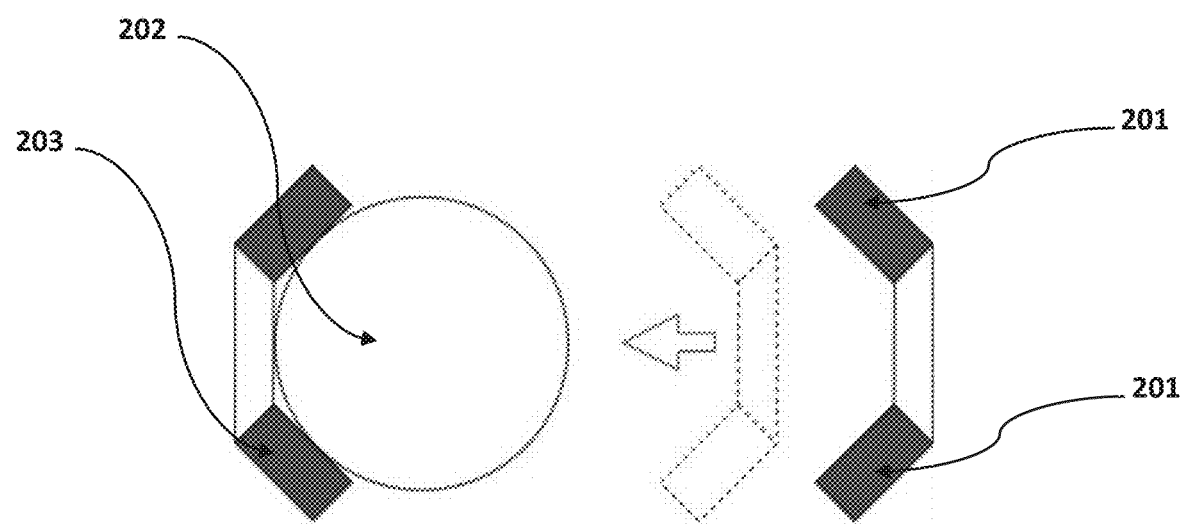
FIG. 2 is a diagrammatic representation of cookware handshake between two electromagnets with variable gripping mechanisms, gripping the cookware.
Figure 3:
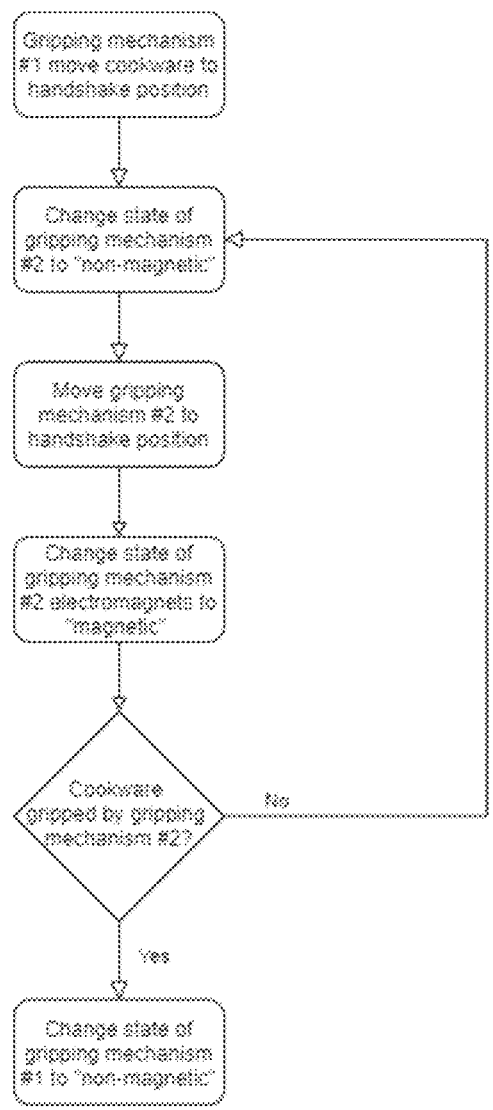
FIG. 3 is a flowchart representing handshake of the cookware between 2 gripping mechanisms.

Referring to FIGS. 2 and 3, which depicts a cookware 202, a first set of electro magnets 203 and a second set of electromagnets 201 can be set of for transferring of cookware from one position to another position for different operations, to initiate the handshake mechanism of cookware. In this mechanism considering for example, a first operation of cooking is complete and a second operation of washing the cookware needs to be undertaken. Gripping of the cookware needs to be undertaken in two stages.

In the first stage, the cookware 202 needs to be positioned in the handshake position which is undertaken by a first set of electromagnets 203 in which case the electromagnets are magnetic in nature, which grips the cookware and moves it to the desired position. The electromagnets are then deactivated by passing current and hence becoming non magnetic in nature at this instance.

In the second stage, the already positioned cookware in the handshake position by the first set of electromagnet, needs to be gripped by a second set of electromagnets 201 which initiates a second gripping mechanism. In this process, the second set of electromagnets is activated to magnetic, which initiates the second gripping mechanism and grips the cookware and moves to the next required position for next operation of washing. The electromagnets are thereafter deactivated and the electromagnets turned to non-magnetic state.

The activation and deactivation of the gripping function is accomplished using an electrical current. Degaussing electromagnets may be used to generate the magnetic field. In such case the magnetic field will be deactivated by applying electrical current to the electromagnet. The electric current, mostly DC, can be generated by an external power supply and controller by a relay. The relay might receive a signal from a controller, transmitting the current to the electromagnets when state change is required. Degaussing electromagnets will stay permanently magnetic, unless an electric current pass through them, changing their state to non-magnetic. A signal from the controller, triggering the relay, which passes the electric current to the electromagnets, might be received when the cookware gripping force has to be disabled, releasing the cookware. Alternatively, toggling with the electromagnets magnetic state might be required when gripping the cookware.

In some embodiments, the gripping force is retained even during power failure. Since, degaussing electromagnets results in constant electromagnetic force being applied on the cookware, even in cases of power loss in the system, hence, this configuration of degaussing of the electromagnets is utilized thereby, assuring that the cookware remains gripped at all times in the gripping mechanism, until an electrical current is applied.

The present disclosed subject matter may be a system, a method, and/or a computer program product. The computer program product may include a computer readable storage medium (or media) having computer readable program instructions thereon for causing a processor to carry out aspects of the present disclosed subject matter. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter. Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions, These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. it will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The invention claimed is:

1. A cookware handling system comprising:
 a first set of electromagnets;
 a second set of electromagnets;
 with each of the respective set of electromagnets having respective gripping mechanisms;
 a cookware;
 a ferritic sleeve directly mechanically attached to the cookware;
 a controller;
 a relay; and
 an external power supply,
 wherein, the system is configured to picking and transferring the cookware, and is further configured to:
 activate the first set of electromagnets to grip and position the ferritic sleeve and the cookware in a handshake position;
 to subsequently deactivate the first set of electromagnets and to release the ferritic sleeve and the cookware in a new position;
 to activate the second set of electromagnets to grip the ferritic sleeve and the cookware in the handshake position and to move the gripped ferritic sleeve and the cookware to a desired position; and to then deactivate the second set of electromagnets; and
 wherein; gripping of the cookware with the ferritic sleeve is affected by an electromagnetic force generated by friction between the respective sets of electromagnets and the cookware.

2. The system of claim 1, wherein, an electric current is generated by the external power supply, and the relay is configured to deactivate the respective gripping mechanisms of the first and second sets of electromagnets.

3. The cookware handling system of claim 1, wherein dimensions of the ferritic sleeve are dependent on dimension of the cookware.

4. The cookware handling system of claim 1, wherein the dimensions of the ferritic sleeve are derived from the type, dimensions and electromagnetic force of the first and second sets of electromagnets.

5. The cookware handling system of claim 1, wherein the shape of the first and second sets of electromagnets are determined by the geometry of the cookware.

6. The cookware handling system of claim 1, wherein the physical properties of the ferritic sleeve serve to determine the electromagnetic force generated by the first and second sets of electromagnets.

7. The cookware handling system of claim 3, wherein physical properties of the said ferretic sleeve include a thickness of the ferretc sleeve, a surface finish, and curvature of the ferritic sleeve.

* * * * *